INVENTORS
WALTER R. GUSTAFSON
WILLIAM H. McMILLEN
BY
ATTORNEY

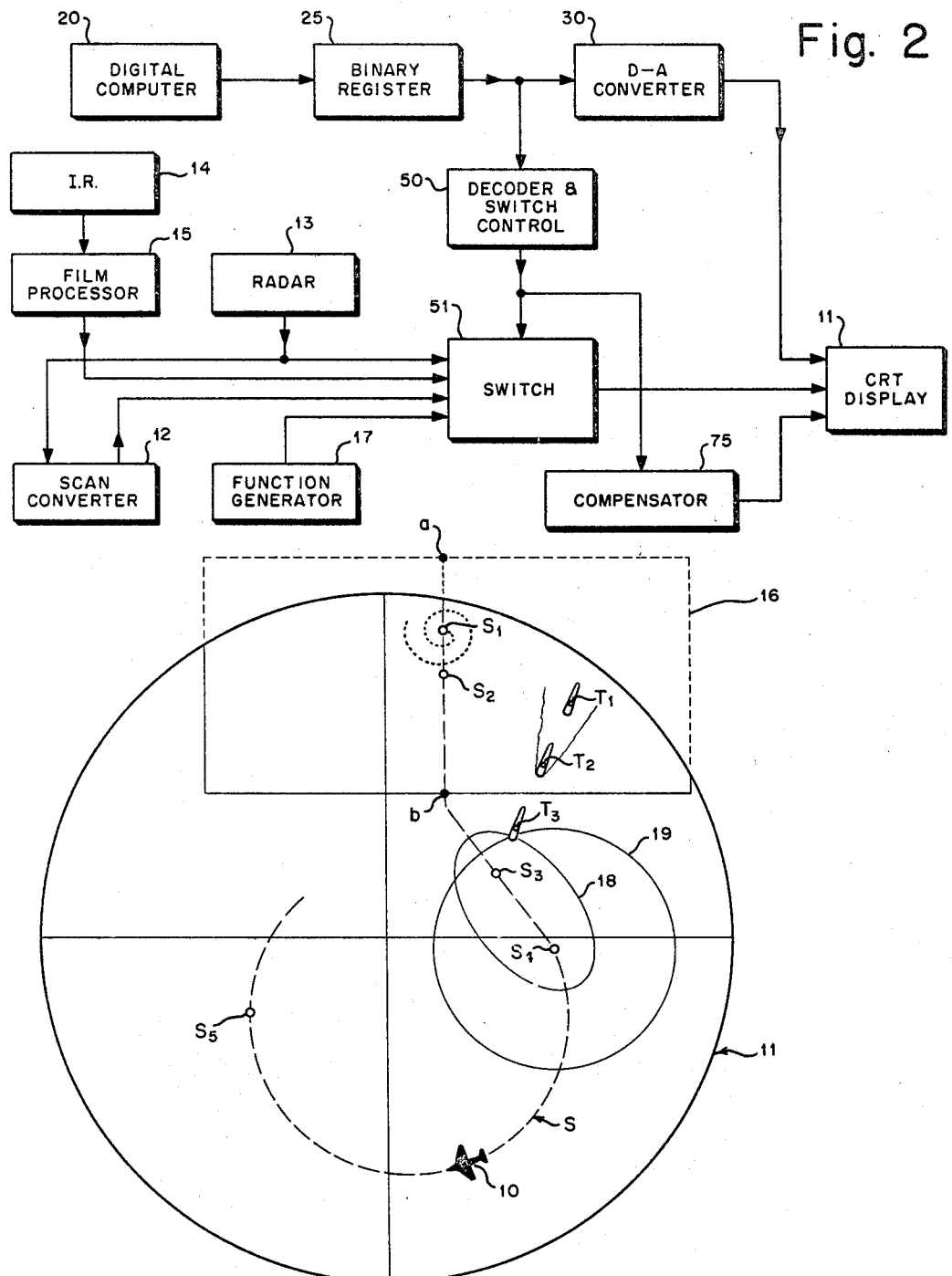

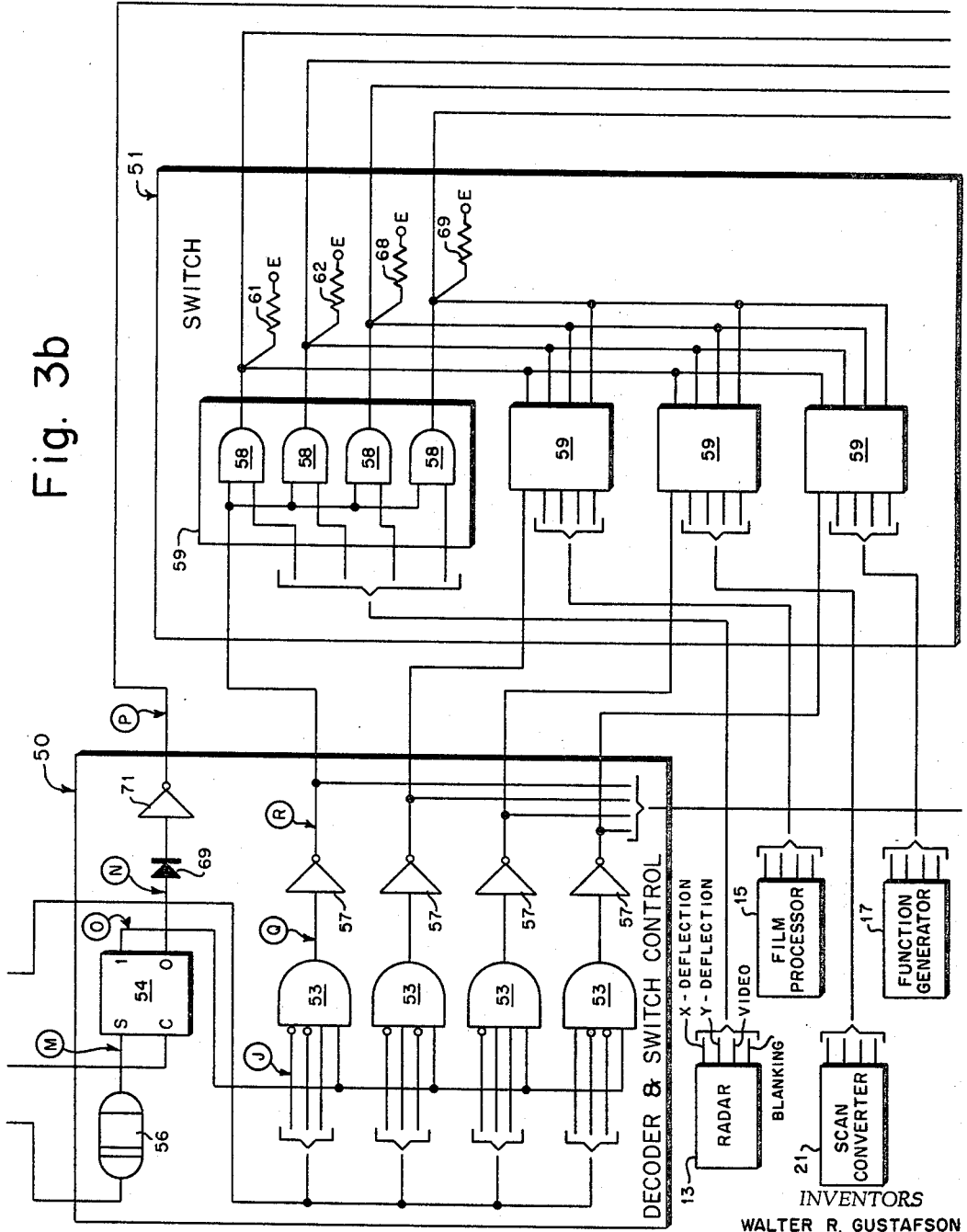

April 23, 1968　　W. R. GUSTAFSON ET AL　　3,380,028
MULTI-SENSOR DISPLAY APPARATUS
Filed March 25, 1965　　　　5 Sheets-Sheet 4
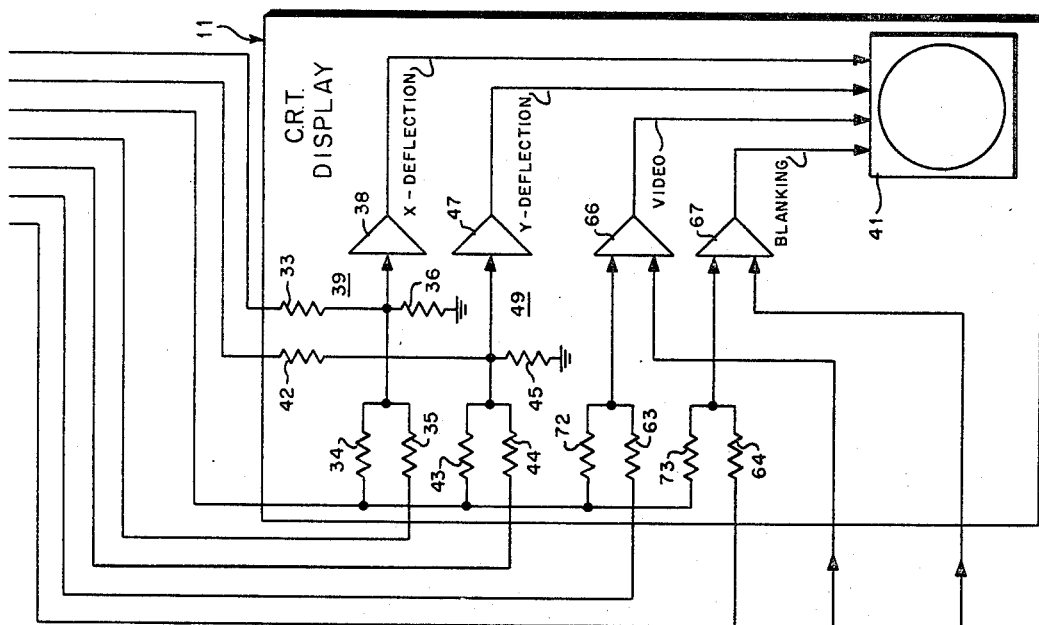
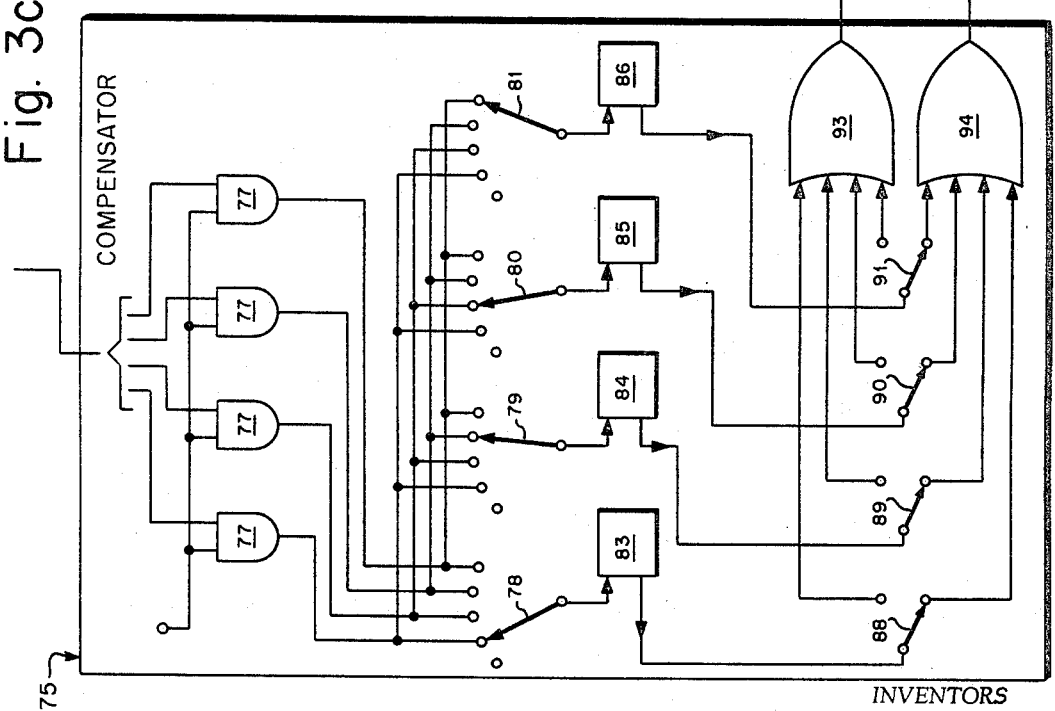
Fig. 3c
INVENTORS
WALTER R. GUSTAFSON
WILLIAM H. McMILLEN
BY
ATTORNEY INVENTORS
WALTER R. GUSTAFSON
WILLIAM H. McMILLEN

ATTORNEY 3,380,028
MULTI-SENSOR DISPLAY APPARATUS
Walter R. Gustafson, Furlong, and William H. McMillen, Levittown, Pa., assignors to the United States of America as represented by the Secretary of the Navy
Filed Mar. 25, 1965, Ser. No. 442,842
9 Claims. (Cl. 340—172.5)

ABSTRACT OF THE DISCLOSURE

A binary coded multiplexing system for producing a composite CRT display of various information formats such as infrared, radar, scan converters and function generators. Each format has a corresponding digitally encoded word for X and Y displacement coordinates and format identification. The displacement coordinates are converted into analog signals for combining with the format deflection coordinates, and the format identification portion selects one of the plurality of formats for display. Thus, various formats of information may be multiplexed for simultaneous display about different points on the display irrespective of the sequence in which they are multiplexed. Compensation for respective formats is also provided.

---

The invention described herein may be manufactured and used by or for the Government of the United States of America for governmental purposes without the payment of any royalties thereon or therefor.

The present invention relates to apparatus for coordinating information from a multiplicity of sensors, such as television, radar, scan converters and function generators; and more particularly to a multi-sensor display for use in airborne ASW (antisubmarine warfare) missions concerned with the detection and localization of submarines.

The development of an ASW system for the detection and localization of submarines, particularly as applied to airborne ASW patrol aircraft, has resulted in a multiplicity of individual sensor display subsystems—each having a display format distinct unto itself, having its own peculiar advantages and limitations and requiring special skills in interpretation and correlation with other sensor displays. At different stages of an ASW mission execution, some subsystems are known to be unreliable while others require corroboration. The effectiveness of the mission therefore depends on giving the proper weight and interpretation to the information obtained from each of these subsystems. Where mission success depends on such efficient recognition of the usable data from the various subsystems, preoccupation of the air crew with operation and maintenance of each display subsystem and correlation between display formats must be minimized. Existing integrated multi-sensor display systems have not satisfied these needs.

In an airborne ASW integrated display, the sensor subsystems produce position information of objects detected under water in a given geographical area. The original positional data generated by the subsystems are usually incompatible with each other for at least two important reasons. One, their display formats are unique in character and factorial conversion; and two, the data obtained from each are unique in geographical reference or display orientation. For example, the data from an IR (infrared) detector collected while the aircraft was in one geographical position will be completely incompatible with data collected from sonobuoys dropped at some later geographical position of the aircraft. Heretofore, the conversion and reduction of data from a multiplicity of sensors and their integration into a composite display for easy recognition and correlation have required a great deal of equipment which has become unacceptable for airborne use due to their increased weight, size, complexity and decreased reliability. In addition, prior art integrated display systems are not readily adaptable for the addition of random-plotted information such as numbers and symbols, nor can the operator at any stage of the mission readily choose to display information from selected sensors to the exclusion of other unnecessary or unreliable information.

Accordingly, it is an object of the present invention to provide an improved integrated display system particularly suitable for airborne use in which a plurality the prior are systems, and in which the several formats can be selectively displayed about different points in the display to form thereby a real-world composition of a tactical plot of an underwater object detection and localization mission.

Another object of the invention is to provide a novel integrated display system which has a capability for electronically multiplexing a plurality of selected display formats and corresponding predetermined discrete reference or center positions to a single display unit.

Still another object of the invention is to provide a novel electronic multiplexer which utilizes digital coding techniques for determining the sequence and permutation of a plurality of display formats appearing at the output thereof.

A further object of the invention is to provide a novel and improved integrated display system which employs solid state components for electronic multiplexing of a plurality of display formats to a single cathode ray tube display obviating thereby the necessity of large and heavy electrical components usually encountered in the prior art systems, and in which the several formats to the integrated display are automatically correlated for easy recognition and analysis by the operator whereby the airborne ASW mission effectiveness is substantially enhanced.

Various other objects and advantages will appear from the following description of one embodiment of the invention, and the most novel feature will be particularly pointed out hereinafter in connection with the appended claims.

As described in more detail hereinbelow, the integrated display system in the illustrated embodiment of the invention receives display formats from an IR detector, radar, a scan converter, and a function generator wherein they are selectively displayed on a CRT (cathode ray tube). The particular sequence and permutation of the formats appearing on the CRT are determined by digital words in binary code received from a digital computer in which all of the desired sequences and permutations have been programmed and stored. The digital computer also provides discrete reference or display position information to the CRT for the corresponding formats selected for display. Obviously, the display formats are not limited to those described in this embodiment and the number may be decreased or increased as desired without departing from the fundamental inventive concepts disclosed herein. Thus, the integrated display system of the present invention provides capability for selecting only those formats for display which will be useful to the operator either as the primary detection or localization source or as a secondary or corrobative information source. This is accomplished by means of an electronic multiplexer which utilizes digital techniques achieving thereby substantial flexibility and reliability without cluttering the display with irrelevant information.

In the drawing:

FIG. 1 represents a typical composite plot of an airborne ASW mission as applied to the disclosed embodiment;

FIG. 2 is a single line block diagram of one embodiment of an integrated display system according to the present invention;

FIGS. 3a, 3b and 3c represent in more detail the logic and electrical circuits utilized in the embodiment of FIG. 2;

Figure 3A:
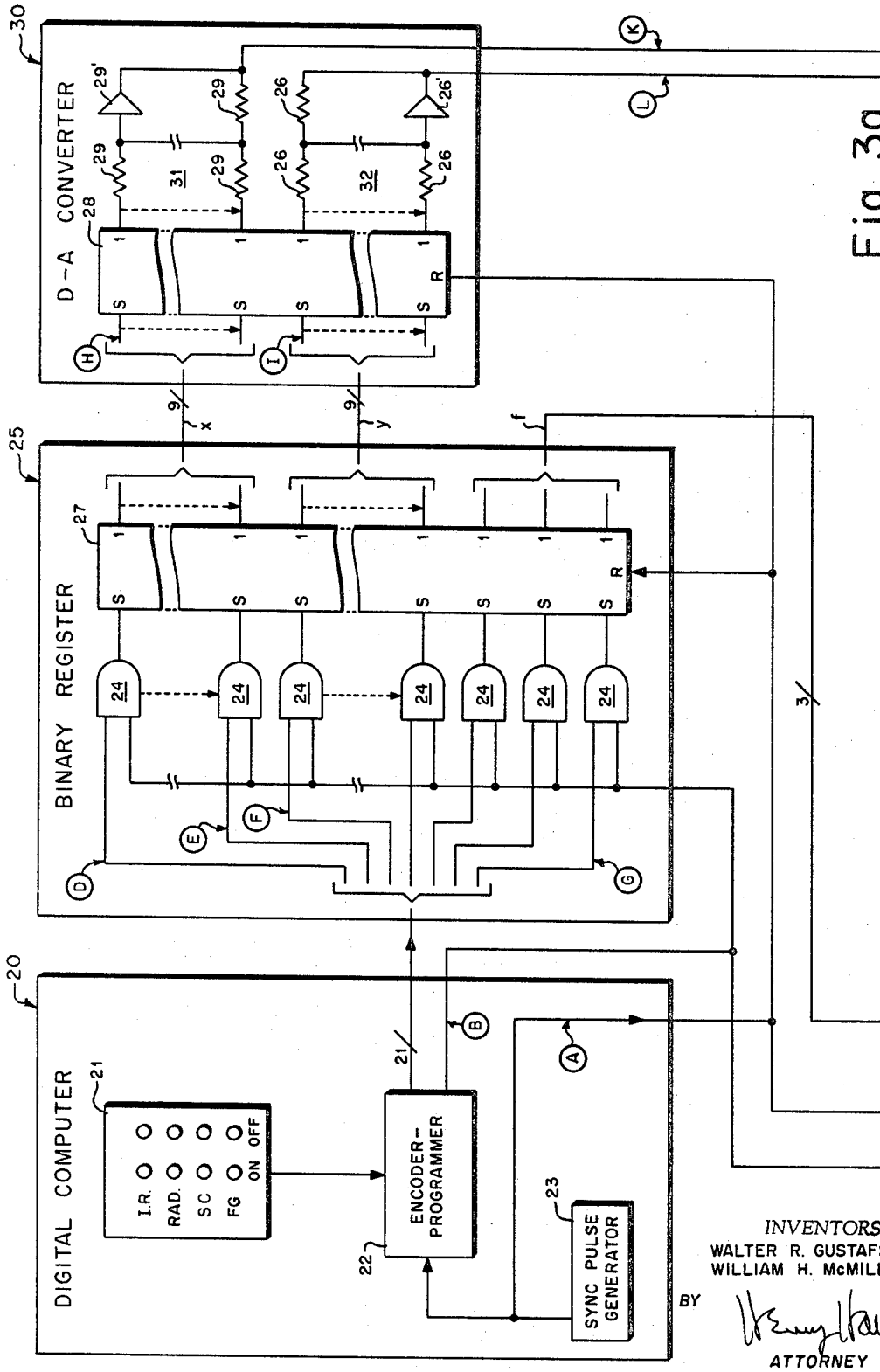

In order to understand the mode of operation of the integrated display system of the present invention, one embodiment is disclosed as applied to an airborne ASW mission. Referring first to FIG. 1 a composite display of a geographical area of search is shown for the disclosed embodiment as applied to a typical airborne ASW mission. The broken line S represents the path taken by an ASW patrol aircraft 10 over the geographical area produced on the face of a CRT display 11. The display 11 is also shown in block diagram form in the illustrated embodiment of FIG. 2. At position $S_1$, the image produced by a radar unit 13 was recorded by a conventional spiral scan converter 12 in which a snorkeling submarine was detected at a target position $T_1$. As the aircraft 10 proceeded across position $S_2$, an IR detector 14 generated and stored a picture 16 containing infrared data on film in a processor 15 in which the submarine is shown at a new target position $T_2$. The output of processor 15 will form a TV raster. Continuing further along the flight path S, two sonobuoys were dropped at positions $S_3$ and $S_4$, respectively. Also, at position $S_4$, an explosive charge was dropped and using well-known sonar techniques, target detection and localization are made possible. The returned sonar data from the sonobuoys operate computers which generate the loci of several mathematical functions for display. In the illustrated embodiment, two function generators 17, only one being shown, produce outputs capable of generating an ellipse 18 and a circle 19 on the display 11 whose intersection thereon represents the submarine at a still later position $T_3$. At the last-mentioned position $S_4$, it is desirable to display the information previously recorded at positions $S_1$ and $S_2$. The spiral scan converter 12 is used to read out and reproduce the electric signals of the radar scan recorded therein at position $S_1$. Similarly, the IR picture 16 about $S_2$ is read out as a television raster in any conventional manner and reproduced as an input for composite display. These and other information sources or display formats are integrated into the composite display at FIG. 1 in a manner explained hereinbelow. The aircraft 10 meanwhile proceeds on an attack course during which the output from the radar unit 13 may be observed as at the aircraft position $S_5$. It should be noted that the positions $S_1$, $S_2$, $S_3$, etc., are shown relatively far apart merely for illustration. In actual practice, the time duration between these positions could be relatively short so that the target positions $T_1$, $T_2$, and $T_3$ will substantially coincide and thereby corroborate each other.

The rectangular coordinates $x$ and $y$ of the aircraft 10 at positions $S_1$, $S_2$, $S_3$, etc., are stored in binary code in a digital computer 20 in a conventional manner known in the art together with a binary code corresponding to their respective information sources or display formats to form a digital "word" for subsequent transmission. In the illustrated embodiment, each digital word comprises twenty-one bits: the first nine are assigned to define an X-coordinate; the second nine, to define a Y-coordinate; and the last three, to define a particular display format associated with the X and Y coordinates of $S_1$, $S_2$, or $S_3$, etc. Of course, it is contemplated that some code other than binary may be used without departing from the inventive concept.

Figure 4:
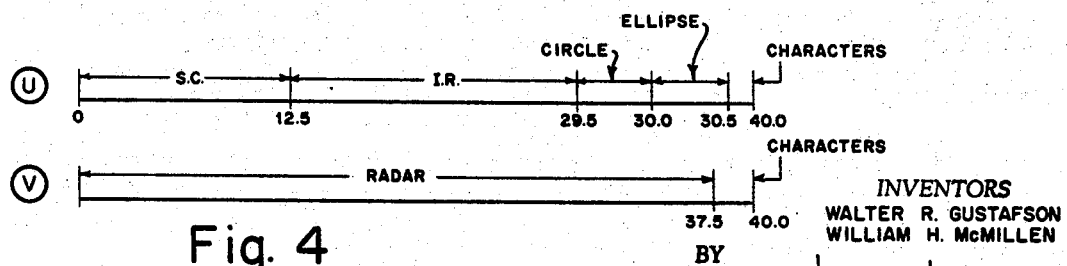
FIG. 4 represents a typical time distribution diagram for the particular formats as applied to the disclosed embodiment.

The particular sequence in which digital words appear at the output of the computer 20 for each selected combination of display formats to be displayed is predetermined and programmed in the computer 20. The time duration of each digital word at the computer output is also programmed beforehand, but their combined time must not exceed the time required on the CRT display 11 for one field in the case of TV, or one frame for other information. In the illustrated embodiment, this time was determined to be 40 milliseconds. Phosphor decay, bandpass, etc., are the determining factors. FIG. 4 illustrates typical sequences and time allotments for various display formats selected for display. The time allotment required for each format is fixed, however, its position relative to the other format time slots within each 40-millisecond field or frame is programmed in the digital computer 20 as a function of the particular combination of formats selected for composite display. Time distribution graph U of FIG. 4 shows the computer 20 as allocating the first 12.5 milliseconds for the scan converter format, the next 17 milliseconds to the TV format from processor 15, and the next two 0.5-millisecond slots to circle and ellipse function formats. The remaining 9.5 milliseconds have been reserved for character generation, and do not form a part of the present invention. In graph V of FIG. 4, a time slot of 37.5 milliseconds is allocated to the radar format with 2.5 milliseconds remaining for character generation. Obviously, other formats may be substituted for those illustrated which may require different time allotments.

Figure 5:
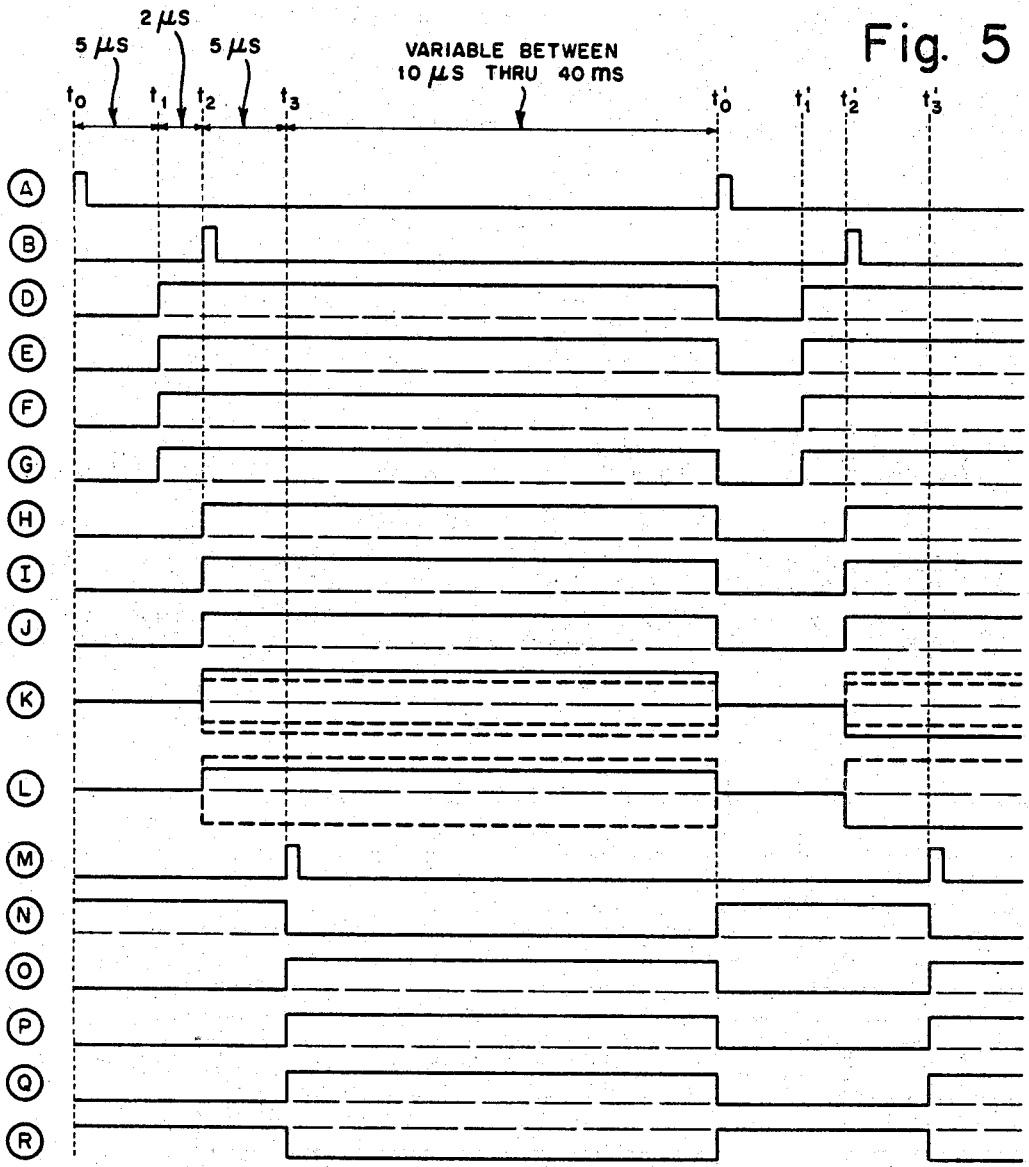
FIG. 5 is a timing diagram for one display format of FIG. 4 as applied to the disclosed embodiment.

The display formats desired for composite display are selected in the computer 20 by push buttons 21, FIG. 3a, which are operatively connected to an encoder-programmer unit 22 in which the format codes, sequencing and time allocations are stored with the corresponding codes of X and Y coordinates of positions $S_1$, $S_2$, $S_3$, etc. Typical signals for a format time allocation are shown in FIG. 5 for the spiral scan converter display format of graph U of FIG. 4. A sync pulse generator 23, operatively connected to the encoder-programmer unit 22, produces a signal A having pulses at time $t_0$, $t_0'$, etc., which are 40 milliseconds apart. This operates the unit 22 whereby digital words corresponding to the selected formats appear at times $t_1$, $t_{1'}$, etc., in the programmed sequence and time allocations. Each digital word may be presented in either serial or parallel bits. In this disclosure they are in parallel. Thus, for the scan converter format a digital word first appears at time $t_1$. Selected bits of the word are shown by the signals D, E, F and G at one input to a plurality of AND gates 24 of a binary register 25. There being twenty-one bits to the word, there are twenty-one AND gates 24. The time between $t_0$ and $t_1$ is determined by the encoder-programmer unit 22.

At a still later time $t_2$, the unit 22 produces a pulse shown in signal B at its output which is fed to the other input of each AND gate 24. The digital word is thereby transferred to respective "Set" or S inputs of a storage register 27. At this time $t_2$, the signals D, E, F and G have no further effect on operation. The first eighteen "1" outputs of the register 27, representing X and Y coordinates of reference position $S_1$, are connected to respective S inputs of another storage register 28 in a digital-analog converter 30. As used in this disclosure the storage register 27 represents a bank of flip-flops used in parallel. The "1" output level of each flip-flop is active when a signal is applied to the S input. The "1" output level is inactive when a signal is applied to the "Reset" or R input. In FIG. 5, the first and ninth S inputs to register 28 are represented by the signals H and I. The first nine "1" outputs of the shift register 28 are connected in a D-A summing network 31 to produce an analog signal K for the X coordinate. The summing network 31 is of conventional circuit design including resistors 29 and amplifier 29' in which each combination of "1" outputs from the register 28 will add up to a discrete D.C. voltage indicative of the X coordinate of the digital word. Similarly, the second nine "1" outputs of the register 28 are connected in a D–A summing network 32 including resistors 35 and 35' to produce an analog signal L for the Y coordinate. As shown in FIG. 5, the X and Y coordinate signals K and L are constant D.C. voltages between time $t_2$ and $t_0$; however, their amplitudes will vary from cycle to cycle depending on the particular format displayed.

The X-coordinate signal K is fed through a resistor 33, FIG. 3c, to the input of an x-deflection amplifier 38. The combination of resistor 33 with resistors 34, 35 and 36 constitutes an x-deflection summing network 39. The summation signal at the output of the amplifier 38 is connected to the x-deflection input of a CRT 41 in the display 11. Similarly, the Y-coordinate signal L is fed through a resistor 42 to a y-deflection amplifier 47; and the combination of resistor 42 with resistors 43, 44 and 45 constitute a y-deflection summing network 49. The summation signal at output of the amplifier 47 is connected to the y-deflection input of the CRT 41. Thus, for a particular digital word representing the $x$ and $y$ coordinates of a display format at position $S_1$, $S_2$ or $S_3$, etc., the deflection inputs of the CRT 41 are biased so that the center position of the display format corresponds with said positions.

Coincidence of each display format as encoded in the last three bits of the digital word with its reference position coordinates on the CRT 41 is accomplished through a decoder and switch control 50 and a switch 51, FIGS. 2 and 3b. In the illustrated embodiment, the display formats of the radar 13, film processor 15, function generator 17, and scan converter 12 are connected as inputs to the switch 51. These inputs comprise signals for X and Y deflection, video, and blanking (or unblanking).

The manner in which control 50 and switch 51 operate on these inputs is best explained with reference to FIG. 3b. The last three "1" outputs of the storage register 27 are fed in parallel to a plurality of AND gates 53 whose functions are activated by different combinations of input signals. The number of AND gates 53 in the control 50 is determined by the number of display formats to be multiplexed into the display 11. In this disclosure, the four formats are radar, IR detection (TV), spiral scan, and function generation. As shown in the logic symbology, the small circles at the inputs to the AND gates 53 indicate that relatively low input signals activate the function, while no circle indicates that a relatively high input signal activates the function. In binary code, the four illustrated AND gates 53 are activated by the numbers 0011, 0101, 0111 and 1001, respectively. The first three digits are the display formats encoded in the encoder-programmer unit 22 coincident with their corresponding set of X and Y coordinates of the positions $S_1$, $S_2$, $S_3$, etc. The last digit is determined by the "1" output from a binary register 54 which has an S input connected to receive signal M from the delay 56. The "clear" or C input receives the signal A from the sync pulse generator 23. As shown in FIG. 5, the delay device 56 receives the signal B and produces a signal M pulse at time $t_3$ which is five microseconds after $t_2$. Thus, at a time $t_3$, after storage registers 27 and 28 are set at time $t_2$ by signal B, a relatively high signal, signal O, appears at the "1" output of the register 54 to activate the AND gates 53 depending upon the relative magnitude of the other inputs $f$ from the register 27. Signal J in FIG. 5 represents one of these inputs.

The output, such as signal Q of FIG. 5, from each AND gate 53 is connected to an inverting amplifier 57 whose output, such as signal R, is then fed to one input of each of four AND gates 58. Each four commonly connected gates 58 comprise a gate bank 59. The number of AND gates 58 per gate bank 59 is determined by the number of information signals necessary for each format. In this disclosure there are four information signals per display format, i.e., X and Y deflection, video, and blanking (or unblanking) signals. The number of gate banks 59 in the switch 51 is determined by the number of display formats. In this disclosure there are four, i.e. radar, spiral scan, TV (IR detection), and function generation. The output of the X-deflection AND gate 58 of each gate bank 59 is connected in common to the resistor 35 of the X-deflection summing circuit 39 in the display 11. A resistor 61 connected to the common connection at one end and to a fixed voltage E at the other provides common termination for the outputs. Similarly, the outputs of the Y-deflection AND gate 58 of each gate bank 59 is connected in common to the resistor 44 of the summing circuit 49 in the display 11. A resistor 62 is likewise connected between the common connection and a fixed voltage E. The outputs from the video and blanking (or unblanking) AND gates are respectively connected through resistors 63 and 64 to video and blanking amplifiers 66 and 67, whose outputs in turn are connected to the video and blanking circuits of the CRT 41 in the display 11. Resistors 68 and 69 connected between the respective common connections of the AND gates 58 and the voltage E act in the same way as the resistors 61 and 62.

The output of the sync pulse generator 23, signal A, is also connected to the "clear" or C input of the binary register 54. When the pulse at time $t_0$ appears at the C input, a relatively high output signal N of FIG. 5, appears at the "0" output of the register 54. This is connected through a diode 69 to an inverting amplifier 71. The output thereof, signal P, is then commonly connected to the resistors 34 and 43 of the circuits 39 and 49 and also to resistors 72 and 73 which, in turn, are connected to the inputs of the amplifiers 66 and 67, respectively. This provides compensation for the voltage levels existing at the inputs to amplifiers 38, 47, 66 and 67 between the pulses occurring at times $t_0$ and $t_3$.

The illustrated embodiment also provides selective multiplexing of various forms of conventional compensation ordinarily required for various non-identical format inputs. For example, there is STC (slow-time constant) or FTC (fast-time constant) for radar, and ramp compensation for constant frequency spiral scan. Accordingly, a compensator unit 75, FIGS. 2 and 3c, provides predetermined compensating signals to the video and blanking amplifiers 66 and 67 of the CRT display 11 in response to the output from the decoder and switch control 50.

As mentioned previously, the inverting amplifier 57 which is conducting determines which of the formats is being displayed on the CRT 41. The outputs of each amplifier 57 are therefore respectively connected to one of two inputs of AND gates 77 in the compensator unit 71. The number of gates 77 is determined by the number of display formats. In this case there are four. The other inputs are connected in common to a relatively high voltage E. When an amplifier 57 conducts and a relatively high signal appears at both inputs of an AND gate 77 it is activated and a signal appears on the output thereof. The output of each AND gate 77 is selectively connected through manually positioned switches 78, 79, 80 and 81 to compensation circuits 83, 84, 85 and 86, respectively. A voltage from any one AND gate 77 which appears at the input to any one of the compensation circuits 83–86 will activate it producing the particular compensation signal at either manually operated switch 88, 89, 90 or 91, each of which is capable of connecting the compensation signal to either OR gate 93 or 94 depending on whether the compensation signal is characterized to modify the video or blanking (unblanking) signals to the CRT 41. In the illustrated embodiment, compensation circuit 83 provides an enhancement signal to the video (IR detection) signal from the film processor 15; circuit 84 provides video gain compensation for the spiral scan converter 12; circuit 85 provides FTC for the radar unit 13; and circuit 86 provides size compensation for the constant frequency function generator 17.

It should now be apparent that the switches 88–91 permit universal application of the compensator 75 to an integrated display system of this type having plural formats without requiring circuit changes when the formats are modified in sequencing and combination. That is, irrespective of the connections of the display formats 13, 15, 17 and 12 in the switch 51, the compensator 75 may be externally adjusted by the switches 88–91 to correspond.

From the foregoing description, it can now be seen that the present invention will provide means by which a plurality of selected display formats and corresponding predetermined discrete reference or center positions can be electronically multiplexed to a single display unit. The invention is particularly suitable for airborne ASW operations in which numerous types of tactical information having various display formats can be composed and correlated in a single real-world tactical plot of an underwater object detection and localization mission. The multiplexing technique employed affords substantial flexibility in the choice of formats desired for display and compensation therefor.

A typical ASW mission will now be applied with reference to the above-described embodiment. As mentioned previously in connection with FIG. 1, the aircraft 10 flies down the flight path S from the top of the display. Between points $a$ and $b$ the infrared detector 14 records the picture 16 in the processor 15. During this process, a radar scan from the unit 13 and the coordinates of its center at position $S_1$ are stored in the scan converter 12 and the computer 20, respectively, for later read-out. A snorkeling submarine was detected by the radar unit 13 at the position $T_1$. The coordinates of position $S_2$ representing the center of the IR picture 16 are also memorized in X and Y coordinates in the computer 20. The target is also detected by unit 14 at the target position $T_2$. Proceeding along the flight path S, sonobuoys are placed at the positions $S_3$ and $S_4$ and the function generator 17 produces the ellipse 18 and circle 19 whose intersection indicates the submarine at target position $T_3$. With these three separate and distinct types of display formats from a plurality of sensors, the operator can choose to simultaneously display all of the accumulated information generated thus far and accordingly presses the "ON" push buttons 21 for IR, SC, and FG. The encoder-programmer 22 automatically forms digital words for these formats in a predetermined sequence and time allocation such as shown in graph U of FIG. 4. Every 40 msecs. a pulse from the pulse generator 23 triggers the encoder-programmer 22 to transmit the digital "words" in the combination and sequence selected by the operator. In the illustrated graph U, the X and Y coordinates of $S_1$ and the format code for scan conversion appear in parallel binary bits at the input to the binary register 25. AND gates 24 transfer the digital word to the storage register 27. The X and Y coordinate bits of the word are summed in the digital-analog converter 30 to produce analog signals to the summing circuits 39 and 49 of the display 11. The encoded format bits are transferred to the decoder and switch control 50 in which a signal is produced for actuating the AND gate 53 whose output through the inverting amplifier 57 is connected to the same gate bank 59 to which the output signals from the scan converter 12 are also connected. The scan converter signals are thereby transferred through the switch 51 to the summing circuits 39 and 49 and to amplifiers 66 and 67 in the display 11. Thus, the center position of the scan conversion output is shifted to the position $S_1$.

At 12.5 milliseconds, the digital word at the output of the encoder-programmer 22 automatically changes to identify the X and Y coordinates of the position $S_2$ and the format code for switching the IR data from the film processor 15. The X and Y coordinate bits are converted into analog form at the output of the $d$-$a$ converter 30 while the format bits activate the gate bank 59 which receives the output from the processor 15. Again, these signals will reproduce the IR picture 16 about the position $S_2$. At 29.5 milliseconds, the function generator 17 is switched into generate the ellipse 18 and circle 19. At the end of 40 milliseconds, this entire cycle is repeated and will continue repeating until different push buttons 21 are pushed by the operator. Accordingly, a composite tactical display of the various selected formats is presented on the display 11 from which target information can be accurately and reliably interpreted and correlated.

Some of the many advantages of the invention should now be apparent. The conversion and reduction of data from a multiplicity of sensors and their integration into a composite display for easy recognition and correlation has been greatly enhanced, particularly as applied to airborne use. Solid state components have been employed for electronic multiplexing of a plurality of display formats to a single cathode ray tube display obviating thereby the necessity of large, heavy electrical components usually encountered in the prior art systems. Moreover, the several formats to the integrated display are automatically correlated for easy recognition and analysis by the operator whereby the airborne ASW mission effectiveness is substantially enhanced.

It will be understood that various changes in the details, materials, steps, and arrangement of parts, which have been herein described and illustrated in order to explain the nature of the invention, may be made by those skilled in the art within the principle and scope of the invention as expressed in the appended claims.

What is claimed is:

1. An integrated display system for multiplexing and correlating a plurality of information formats in a single display, comprising:
   a plurality of information formats each having output signals suitable for operating a single display;
   switch means having a plurality of inputs respectively connected to said formats for selectively connecting one of said format output signals to the switch means output in response to the switch means control input;
   display means having a first input connected to the switch means output for receiving and displaying the selected format output signals;
   binary register means having an input for receiving and storing a digitally encoded coordinate and format selection signal, said signal including first and second pluralities of bits representing orthogonal coordinates and format identification respectively,
   digital-analog converter means having an input connected to the register means output for reading out and transposing the coordinate bits into an analog signal at the output thereof, said analog signal being fed to a second input of said display means for modifying the first input thereof; and
   decoder and switch control means having an input connected to said binary register means output for reading out and decoding the format identification bits into a discrete signal, said discrete signal being fed to the switch means control input.

2. An integrated display as set forth in claim 1 further comprising, compensator means operatively connected between the output of said decoder and switch control means and a third input of said display means for providing display compensation of non-identical information formats.

3. An integrated display as set forth in claim 1 wherein said binary register means comprises:
   a first plurality of AND gates each having one input connected to receive the coordinate bits of the digitally encoded signal;
   a second plurality of AND gates each having one input connected to receive the format identification bits of said digitally encoded signal;

each of said first and second pluralities of AND gates being further connected at another input in common to receive a first timed pulse;

a storage register having a plurality of "Set" inputs connected respectively to the outputs of each of said AND gates, a common "Reset" input for receiving a second timed pulse, and a plurality of "1" outputs forming the digitally encoded outputs of coordinates and format identification from said binary register.

4. An integrated display system as set forth in claim 3 wherein said digital-analog converter means comprises:

a storage register having a plurality of "Set" inputs forming the input to said converter, a plurality of "1" outputs, and a "Reset" input for receiving said second timed pulse;

a first summing network connected to selected ones of said "1" outputs for producing a first analog signal; and a second summing network connected to the remaining ones of said "1" outputs for producing another analog signal; said analog signals forming the output of said converter means.

5. An integrated display system as set forth in claim 4 wherein said decoder and switch control means comprises:

delay means receiving said first primed pulse and producing a third timed pulse;

flip-flop means having a "Set" input receiving said third timed pulse, a "Clear" input receiving said second timed pulse, and a "1" output;

a plurality of AND gates each having one input receiving said "1" output of said flip-flop means, other inputs receiving said format identification outputs of said storage register, and each of said AND gates having an output activated by different respective combinations of input signals; and inverter means each having an input respectively connected to the output of said AND gates, and the outputs forming the output of said decoder and switch control means.

6. An integrated display system as set forth in claim 5 wherein said switch means comprises:

a plurality of banks each having a plurality of AND gates, said AND gates each having one input respectively connected to the output signals of one of said information formats and the other input connected in common to the output of said decoder and switch control means to receive said discrete signal, each of said AND gates having an output activated when both inputs thereto are energized and respectively connected in common with the corresponding AND gates of the other banks forming thereby the output of said switch means.

7. An integrated display as set forth in claim 2 wherein said compensator means further comprises:

a plurality of AND gates each having one input connected to receive said discrete signals from said decoder and switch control means and another input connected in common to a fixed voltage source;

a first plurality of switches each having multiple contacts respectively connected in common to the outputs of each of said AND gates and a movable contact for transferring selected ones of said outputs;

a plurality of compensating circuits each having an input receiving said selected outputs for producing a compensating output signal;

a second plurality of switches each having a movable contact respectively connected to receive one of said compensating output signals, and multiple contacts operatively connected to selected inputs of said display means.

8. A multiplexing and correlating apparatus, comprising:

register means for receiving and storing a digitally encoded coordinate and format selection signal, said signal including first and second pluralities of bits representing orthogonal coordinates and format identification respectively;

converter means operatively connected to said register means for reading out and transposing the coordinate bits into analog signals;

control means operatively connected to said register means for reading out and decoding the format identification bits into a discrete signal;

switch means responsive to said discrete signal for passing one of a plurality of input signals to a display;

combining means for combining the switch means and converter means outputs.

9. A multiplexing and correlating apparatus as set forth in claim 8 further comprising:

compensator means operatively connected between said control means and said combining means for providing display compensation of non-identical information formats.

References Cited
UNITED STATES PATENTS

| | | | |
|---|---|---|---|
| 3,076,961 | 2/1963 | Bibbero | 178—6.8 X |
| 3,180,931 | 4/1965 | Morchand | 178—6.8 |
| 3,180,932 | 4/1965 | Oppenheimer | 178—6.8 |
| 3,185,980 | 5/1965 | Gustafson et al. | 343—6 |
| 3,191,169 | 6/1965 | Shulman et al. | 343—5 |
| 3,197,621 | 7/1965 | Urquhart | 340 172.5 X |
| 3,200,380 | 8/1965 | Mac Donald et al. | 340—172.5 |
| 3,207,842 | 9/1965 | Flagle | 178—6 |
| 3,261,014 | 7/1966 | Diaz | 343—6 |

PAUL J. HENON, *Primary Examiner.*

ROBERT C. BAILEY, *Examiner.*

P. R. WOODS, *Assistant Examiner.*